April 21, 1964     D. T. CARTER ETAL     3,129,457
METHOD AND APPARATUS FOR EMBOSSING PLASTIC COATED STRIP
Filed April 13, 1960     2 Sheets-Sheet 2
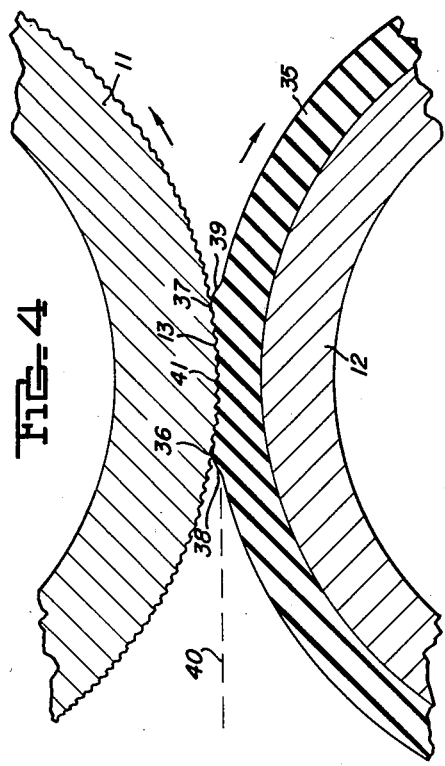
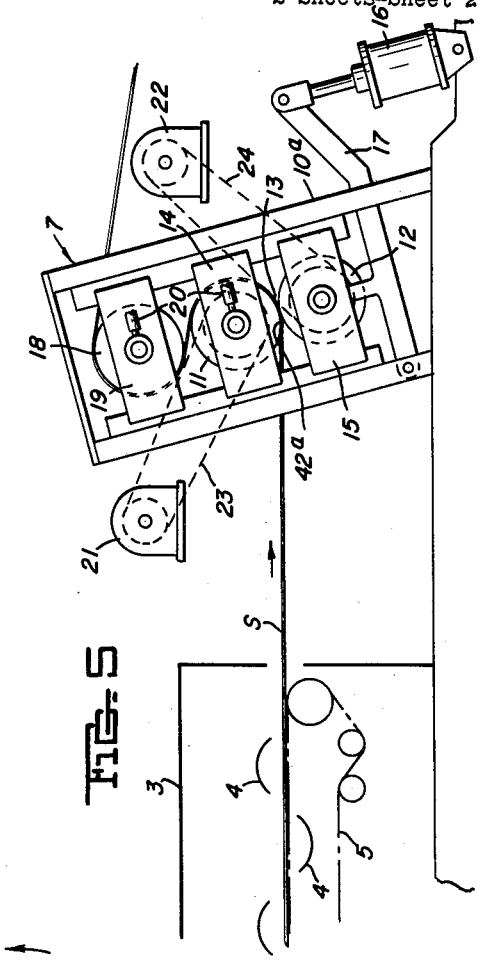
INVENTORS
DANIEL T. CARTER and
GEORGE H. RENDEL
By Donald G. Dalton
Attorney 3,129,457
METHOD AND APPARATUS FOR EMBOSSING PLASTIC COATED STRIP
Daniel T. Carter, Trafford, and George H. Rendel, Pittsburgh, Pa., assignors to United States Steel Corporation, a corporation of New Jersey
Filed Apr. 13, 1960, Ser. No. 21,908
8 Claims. (Cl. 18—10)

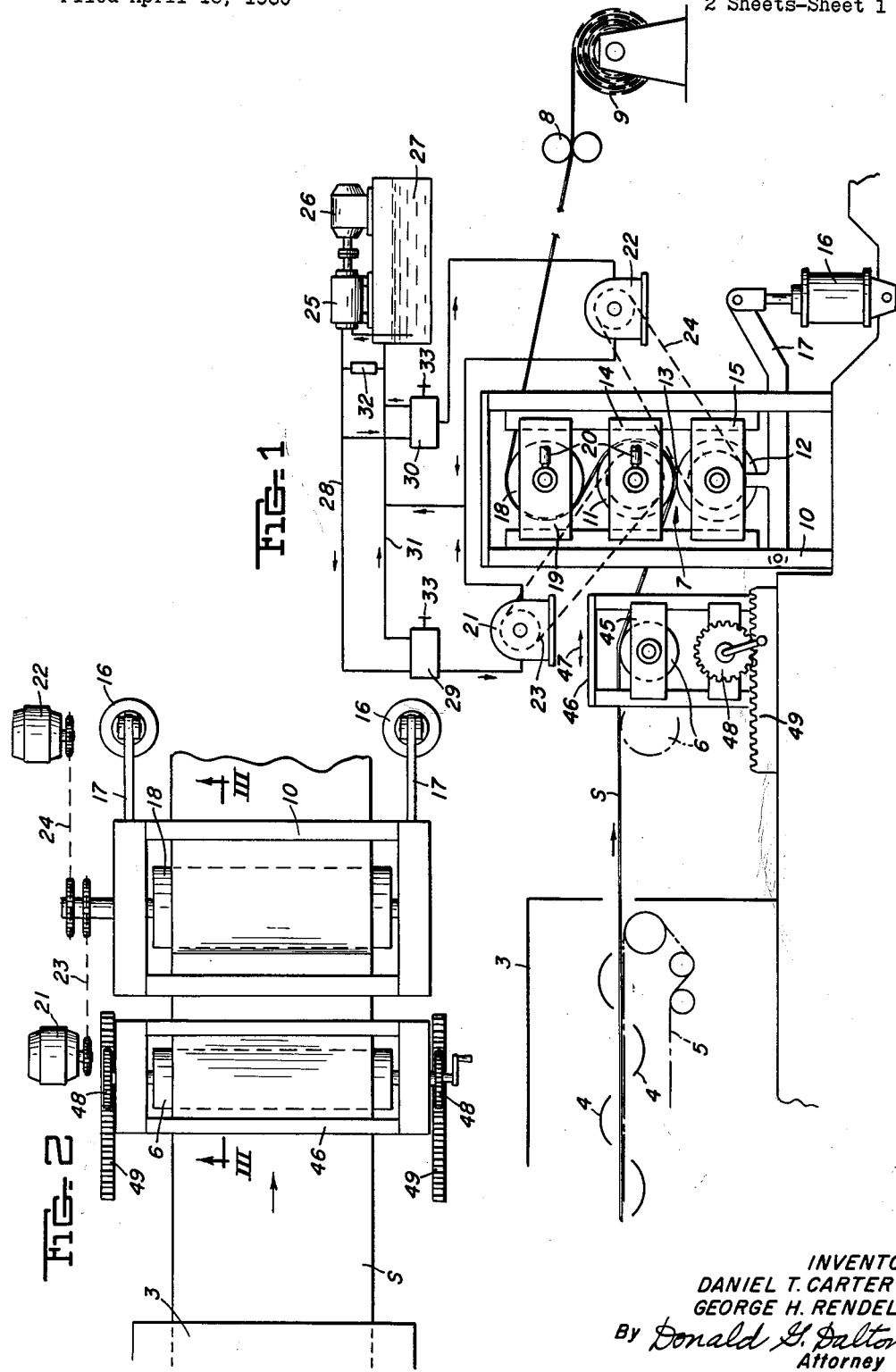

This invention relates to plastic coated metal strip and, more particularly, to a method and apparatus for embossing the plastic coating.

More specifically, this invention relates to metal strip having a bonded coating of thermoplastic synthetic resin thereon and to an embossing operation of the character disclosed in our co-pending application Serial No. 659,897, filed May 17, 1957, now Patent No. 3,034,926. As disclosed in this application, metal strip is initially treated by electrolytically applying thereto a chemically protective phosphate-chromate base coating. After drying, a thin primer or adhesive coating of an organic heat-curable synthetic resin is applied by a roller coater to one side of the strip and is cured by heating. Thereafter, a final coating of a plastisol of a heat-curable synthetic resin, for example, polyvinyl chloride with a plasticizer and diluent added, is applied to the primer coating by a second roller coater. The plastic coating is then cured by heating in a furnace or curing oven to a temperature of from 350° F. to 450° F., at which it is in a semi-fluid or viscous condition. As the strip leaves the curing furnace, it is delivered directly to a set of embossing rolls comprised of an upper steel embossing roll, preferably water-cooled, and a lower rubber backing roll, that are mounted for rotation about parallel axes lying in a vertical plane.

As further disclosed in the said patent the strip is moved through the curing furnace along a horizontal pass-line, and the steel embossing roll is supported in a position tangential to the strip pass-line, while the rubber backing roll is moved upwardly against the bottom side of the strip to force the plastic coating on its upper side into tight engagement with the embossing roll. With the embossing rolls arranged relative to the horizontal pass-line of strip feeding movement in this manner, the strip feeding movement is in a direction normal to the vertical plane containing the roll axes and the center or bite of the rolling pass in accordance with conventional rolling practices. Operation of apparatus of this character has resulted in the production of strip in which the bond between the metal strip and its plastic coating has been weakened or rendered defective. As the result of subsequent investigation, we have determined that this problem is caused, in a manner to be described, by flow of the plastic coating in a linear or lengthwise direction relative to the metal strip as it moves into and through the embossing pass.

One of the principal objects of this invention accordingly is to provide an apparatus and method of embossing plastic coating on strip that eliminates lengthwise flow of the plastic coating relative to the metal strip and consequent weakening of the bond between the metal and the plastic coating. Generally stated, this is accomplished by arranging the apparatus for engagement of the plastic coating with the steel embossing roll in advance of its movement into the embossing pass formed by such roll and the rubber back-up roll, and by regulating the torque applied to the embossing roll through a separate and independent drive therefor to a value such that it does not operate to impart movement to the plastic coating, in either forward or rearward directions relative to the movement of the metal strip to which it is bonded, during the period in which it is engaged with the embossing roll.

Other objects and advantages of the invention will become apparent from the following description and the accompanying drawings, which illustrate diagrammatically two different embodiments of embossing apparatus constructed in accordance with the principles of this invention. In the drawings:

FIGURE 1 is a side elevational view illustrating diagrammatically a preferred embodiment of the invention;

FIGURE 2 is a plan view of the apparatus shown in FIGURE 1;

FIGURE 3 is a diagrammatic sectional view taken substantially along the line III—III of FIGURE 2 showing the manner in which the strip is trained through the embossing roll set, the thickness of the strip being exaggerated for the purpose of illustration in this showing;

FIGURE 4 is a fragmentary sectional view showing the shape of the embossing pass through which the strip is drawn, and FIGURE 5 is a view similar to FIGURE 1 of a modified form of embossing apparatus that embodies the principles of this invention.

As indicated above, the apparatus of this invention is particularly adapted for the purpose of embossing plastic coating on metal strip S, which, with reference to FIGURE 3, comprises a metal base strip 1, preferably a steel strip, and a thermoplastic coating 2 of a heat curable vinyl-chloride polymer bonded to one side of the metal strip 1. As explained in greater detail in the above mentioned patent, the coating 2 is cured by passing the strip S through a heating furnace or oven 3. The oven 3 comprises an elongated chamber provided with heating means such as infra-red lamps or radiators 4, and a conveyor 5 for delivering the strip therethrough in a direction from left to right as viewed in FIGURE 1. When the strip S exits from the oven 3, the thermoplastic coating 2 is at a temperature of from 350° to 450° F. and is in a viscous semi-fluid condition. After leaving the oven 3 the strip S is delivered over a guide roll 6 to an embossing roll stand 7 through which it is drawn and delivered by a set of power driven pinch rolls 8 to a recoiler 9, or a shear (not shown) in the event the strip is to be cut into sheets.

The embossing roll stand 7 comprises a supporting frame 10 in which a steel embossing roll 11 and a rubber back-up roll 12 are rotatably supported. The roll 11, as best shown in FIGURES 3 and 4, has its outer surface engraved with the pattern to be reproduced on the coating 2. The rolls 11 and 12 cooperate to provide an embossing pass 13 through which strip is drawn in a manner to be described. The steel embossing roll 11 is journalled in bearings 14 that have a stationary support on the frame 10, and the back-up roll 12 is journalled in bearings 15 that have a slide support for guided vertical movement in the frame 10. The bearings 15 are actuated by fluid-pressure cylinders 16 through a lever mechanism 17 to force the back-up roll 12 upwardly and the coating 2 on the strip S in the pass 13 against the engraved surface of the steel embossing roll 11. After movement through the pass 13, the strip S is trained over a top roll 18 journalled in bearings 19 that have a stationary support on the frame 10 and from which it is delivered to the pinch rolls 8 and recoiler 9. The top roll 18 and embossing roll 11 are hollow and water-cooled by connections 20. Between the top roll 18 and pinch rolls 8, the strip S is cooled by suitable cooling apparatus (not shown) that includes nozzles for discharging jets of cooling air or water vapor against the strip.

An adjustable torque drive is provided for rotating the rolls 11 and 12 at substantially synchronous speeds. Such drive is illustrated diagrammatically as comprising a pair of fluid-actuated rotary motors 21 and 22, which are connected respectively by chain or belt drives 23 and 24 in driving relation with the rolls 11 and 12. Fluid for operating the motors 21 and 22 is supplied by a constant displacement pump 25 driven by an electric motor 26. The pump 25 draws oil from a reservoir 27 and delivers it through a supply conduit 28 and separate regulating valves 29 and 30 to the rotary motors 21 and 22. Excess fluid and that exhausted from the motors 21 and 22 is returned through a conduit 31 to the reservoir 27. A relief valve 32 is connected between the conduits 28 and 31 to prevent overloading of the pump 25. The valves 29 and 30 are pressure regulating valves and have manually adjustable controls 33 for regulating the pressure of the fluid supplied to the rotary motors 21 and 22 and thereby the torque applied by the mechanical drives 23 and 24 to the rolls 11 and 12 for a purpose to be described. While the drawings illustrate diagrammatically a hydraulic drive for rotating the rolls 11 and 12, it will be understood that such showing is for the purpose of illustration only and that in actual practice of the invention, an electrically operated drive for the rolls 11 and 12 is preferred.

When the back-up roll 12 is forced upwardly against the embossing roll 11 by operation of the air cylinder 16, the rubber covering 35 is compressed and the embossing pass 13 has an arcuate shape with strip entry and exit ends 36 and 37 at circumferentially spaced points about the surface of the embossing roll 11 as shown in FIGURE 4. The deformation of the rubber covering 35 in this manner results in the formation of ridges 38 and 39 of relatively sharp radii at the points 36 and 37. When strip is delivered to a pass of this chracter along a horizontal pass-line, designated diagrammatically by the broken line 40, tangential to the point 41 on the roll 11, which is located at the center of the pass 13 and the bite of the rolls 11 and 12 in accordance with conventional rolling practices as explained above, the strip is forced over the rubber ridge 38 at the entry end 36 of the pass 13. With a roll and pass-line arrangement of this character, the rolls 11 and 12 have been found to act somewhat in the manner of wringer rolls and are inclined to "squeeze-out" the semi-fluid plastic coating 2 from the metal strip 1 as the strip S moves into the pass 13. This results in a flow of plastic material in the coating 2 that weakens its bonded connection with the strip 1. As illustrated diagrammatically in FIGURE 3, this invention eliminates this difficulty by locating the embossing pass 13 at a vertical level below the horizontal pass-line of the strip S through the curing oven 3 and by using the guide roll 6 to divert the path of strip movement from such horizontal pass-line along a path tangential to the embossing roll 11 at a point 42 in advance of its movement into the entry end 36 of the pass 13. By reason of its engagement with the roll 11 at the point 42, the strip S is not forced over the relatively sharp ridge 38 as it moves into the pass 13, and its movement into the pass 13 is effected gradually and gently without any linear movement being imparted to the coating 2 relative to the metal strip 1 as the result of its movement over the ridge 38.

A further advantage is obtained by engaging the coating 2 with the roll 11 at the point 42 in advance of its movement into the embossing pass 13. Since the roll 11 is water-cooled, it exerts a chilling action as it moves into engagement with the plastic coating 2, thus setting up or partially solidifying the surface portion of the coating 2 before movement into the embossing pass 13, and thus minimizing movement or "squeeze-out" of the coating 2 relative to the strip 1 during the embossing operation.

The roll 18 being water-cooled exerts a further chilling or solidifying action on the plastic coating 2. In addition, the roll 18 provides for withdrawal of the strip S out of engagement with the roll 11 at the point 43, which is spaced circumferentially outwardly relative to the exit end 37 of the embossing pass 13. By reason of the tangential engagement of the strip with the roll 11 at the circumferentially spaced points 42 and 43, it will be apparent that the coating 2 is moved gently into and out of engagement with the embossing roll 11 at these points, thereby confining the flow of the semi-fluid plastic coating 2 to that required for embossing its outer surface.

Due to its width as shown in FIGURE 2, the strip S has training engagement over a circumferential portion of the roll 11 lying between parallel and axially extending lines on which the circumferentially spaced points 42 and 43 are respectively located.

As best shown in FIGURE 1, the guide roll 6 is rotatably supported by bearings 45 on a supporting frame or carriage 46. The roll 6 is arranged tangentially with respect to the horizontal pass-line of the strip S through the curing oven 3 and has its surface in rolling engagement with the lower side of the strip and against the metal backing strip 1. The carriage frame 46 is supported for movement back and forth in the space between the exit end of the oven 3 and the roll set 7 as indicated by the arrow 47 in FIGURE 1. A manually rotatable pinion 48 on the carriage 46 has meshing engagement with a stationary gear rack 49 for effecting adjustment of the position of the carriage 46 upon rotation of the gear 48. Adjustment of the position of the carriage 46 and the spacing of the guide roll 6 in a horizontal direction relative to the roll set 7 changes the angular downward inclination of the direction of strip travel to the roll set 7 and the location of the point 42 at which it has initial engagement with the surface of the roll 11.

To further minimize linear movement of the coating 2 relative to the metal strip 1 and consequent weakening of the bond between the coating 2 and strip 1, the torque applied to the roll 11 by the rotary motor 21 through its mechanical drive connection 23 therewith is carefully regulated by adjusting the manual control 33 for the pressure regulating valve 29 to a value such that the roll 11 does not exert any dragging force tending to retard movement of the strip S through the pass 13, and does not exert any driving force tending to move the strip S through the pass 13. In other words, the applied torque is regulated to a value at which the rotary motor 21 is effective to rotate the roll 11 at an angular velocity such that its peripheral surface moves at a linear speed matching that of the speed of strip movement through the pass 13, which is determined by the motor drives for the rolls 12 and pinch rolls 8 shown in FIGURE 1. In this respect, and while the drawings show a separate drive motor for rotating the back-up roll 12, it will be understood that the back-up roll 12 may be an idler roll and, in such case, the force for drawing the strip S through the roll set 7 would be applied by the drive for the pinch rolls 8 or a mechanical drive for the top roll 18.

The modified embodiment of the invention shown in FIGURE 5 eliminates the necessity of the guide roll 6 and provides for location of the embossing roll 11 in a position tangential with respect to the horizontal pass-line of the strip S through the oven 3. This is accomplished by providing a roll set 7 with a frame 10a that is mounted in an angularly inclined position with the axes of the rolls 11 and 12 lying in a vertically inclined plane tilted toward the oven 3 so that the horizontal pass-line of the strip S through the oven 3 is tangential to the point 42a on the roll 11, and the coating 2 thus has initial engagement with the roll 11 at the point 42a which is in advance of the entry end 36 of the rolling pass 13. In other respects, the structure of the embossing stand shown in this figure is identical to that shown in FIGURE 1, and like numerals have been employed to designate like parts.

While two embodiments of our invention have been shown and described it will be apparent that other adaptations and modifications may be made without departing from the scope of the following claims.

We claim:

1. Apparatus for embossing plastic coated metal strip comprising a steel embossing roll, a rubber roll, means mounting said rolls for rotational movement about parallel axes with said embossing roll compressed against said rubber roll and cooperating therewith to form an embossing pass of arcuate shape having strip entry and exit ends at circumferentially spaced points about said embossing roll, means for feeding said strip to said embossing pass including means for guiding its movement along a path tangential to said embossing roll at a point in advance of its movement through said entry pass end, an independent drive for rotating said embossing roll, and means for adjusting the torque applied by said drive to said embossing roll to a value such that it is ineffective to impart relative linear movement to the plastic coating on said strip during its movement through said pass.

2. An apparatus for embossing a thermoplastic coating on one side of metal strip comprising, the combination with a furnace through which said strip travels over a horizontal path with said coating facing upwardly, of an embossing roll set comprising an upper steel embossing roll, a lower rubber back-up roll, means mounting said rolls for rotational movement about parallel axes with said embossing roll compressed against said rubber roll and cooperating therewith to form an embossing pass of arcuate shape having strip entry and exit ends at circumferentially spaced points about said embossing roll, said embossing pass being located at a vertical level below said horizontal path, a guide roll between said furnace and embossing pass and having the upper portion of its periphery at the same vertical level as said horizontal path and in rolling engagement with strip moving from said furnace to said roll set, said guide roll operating in conjunction with said embossing roll to guide the movement of said strip out of said horizontal path and in a downwardly inclined direction tangential to said embossing roll so that said coating engages said embossing roll at a point in advance of its movement into the said strip entry end of said embossing pass, and means for adjusting the horizontal position of said guide roll relative to said embossing roll to thereby change the point at which said coating has initial engagement therewith.

3. An apparatus as defined in claim 2 characterized by said last named means comprising a carriage on which said guide roll is rotatably supported, and means supporting said carriage for movement between said furnace and roll set and for adjusting its position relative thereto.

4. An apparatus for embossing a thermoplastic coating on one side of metal strip comprising, the combination with a furnace through which said strip travels over a horizontal path with said coating facing upwardly, of an embossing roll set comprising an upper steel embossing roll, a lower rubber back-up roll, means mounting said rolls for rotational movement about parallel axes with said embossing roll compressed against said rubber roll and cooperating therewith to form an embossing pass of arcuate shape having strip entry and exit ends at circumferentially spaced points about said embossing roll, said embossing pass being located at a vertical level below said horizontal path, a guide roll between said furnace and embossing pass and having the upper portion of its periphery at the same vertical level as said horizontal path and in rolling engagement with strip moving from said furnace to said roll set, said guide roll operating in conjunction with said embossing roll to guide the movement of said strip out of said horizontal path and in a downwardly inclined direction tangential to said embossing roll so that said coating engages said embossing roll at a point in advance of its movement into the said strip entry end of said embossing pass, means for adjusting the horizontal position of said guide roll relative to said embossing roll to thereby change the point at which said coating has initial engagement with said embossing roll, means for drawing the strip through said embossing pass, a drive means independent of said drawing means for rotating said embossing roll, and means for adjusting the torque applied by said drive means to said embossing roll to a value such that it is ineffective to impart relative linear movement to the plastic coating on said strip during its movement by said drawing means through said embossing pass.

5. An apparatus for embossing a thermoplastic coating on one side of metal strip comprising, the combination with a furnace through which said strip travels, of an embossing roll set comprising a steel embossing roll, a rubber roll, means mounting said rolls for rotational movement about parallel axes with said embossing roll compressed against said rubber roll and cooperating therewith to form an embossing pass of arcuate shape having strip entry and exit ends at circumferentially spaced points about said embossing roll, said rubber roll having an axially extending ridge on its external surface along the said entry end of said embossing pass, and means for feeding strip to said embossing roll set along a path extending tangentially to said embossing roll at a point in advance of said embossing pass strip entry end to engage said coating with said embossing roll prior to movement into said embossing pass, said feeding means operating to deliver said strip into said embossing pass without engagement and distortion by said ridge and thus without relative movement of the said thermoplastic coating thereon.

6. An apparatus for embossing a thermoplastic coating on one side of metal strip comprising, the combination with a furnace through which said strip travels over a horizontal path with said coating facing upwardly, of an embossing roll set comprising an upper steel embossing roll, a lower rubber back-up roll, means mounting said rolls for rotational movement about parallel axes with said embossing roll compressed against said rubber roll and cooperating therewith to form an embossing pass of arcuate shape having strip entry and exit ends at circumferentially spaced points about said embossing roll, said embossing pass being located at a vertical level below said horizontal path, and a guide roll between said furnace and embossing pass and having the upper portion of its periphery at the same vertical level as said horizontal path and in rolling engagement with strip moving from said furnace to said roll set, said guide roll operating in conjunction with said embossing roll to guide the movement of said strip out of said horizontal path and in a downwardly inclined direction tangential to said embossing roll so that said coating engages said embossing roll at a point in advance of its movement into the said strip entry end of said embossing pass.

7. In a method of embossing hot viscous semi-fluid thermoplastic coating on one side of metal strip by feeding the strip through an arcuate embossing pass between an embossing roll and a rubber back-up roll, said arcuate embossing pass having strip entry and exit ends at points spaced circumferentially of said embossing roll and said rubber back-up roll having an axially extending ridge along the said entry end of said pass, the step which comprises feeding said strip to said pass along a path extending tangentially with respect to said embossing roll at a point in advance of said pass entry end to engage said coating with said embossing roll prior to movement into said embossing pass and to thereby render the said ridge on said rubber back-up roll ineffective to cause relative movement between said metal strip and the thermoplastic coating thereon as the strip moves into said pass.

8. The method defined in claim 7 characterized by the step of rotating said embossing roll independently of the feeding movement of said strip while regulating the torque applied to said embossing roll to a value such that it does not cause linear movement of said coating relative to said metal strip during movement through said pass.

References Cited in the file of this patent

UNITED STATES PATENTS 2,609,568     Getchell _____ Sept. 9, 1952
2,851,372     Kaplan et al. _____ Sept. 9, 1958

OTHER REFERENCES

Modern Plastics Encyclopedia, September 1957, Modern Plastics (N.Y.), pp. 444–4417 relied on.